US008823975B2

(12) United States Patent
Uchida

(10) Patent No.: US 8,823,975 B2
(45) Date of Patent: Sep. 2, 2014

(54) INFORMATION PROCESSING APPARATUS AND INFORMATION PROCESSING METHOD

(75) Inventor: Tatsuro Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 825 days.

(21) Appl. No.: 12/567,384

(22) Filed: Sep. 25, 2009

(65) Prior Publication Data

US 2010/0078883 A1 Apr. 1, 2010

(30) Foreign Application Priority Data

Sep. 30, 2008 (JP) ................................ 2008-255503

(51) Int. Cl.
*G06F 3/12* (2006.01)
*G03G 21/02* (2006.01)
*G03G 15/00* (2006.01)

(52) U.S. Cl.
CPC ............ *G03G 15/6538* (2013.01); *G03G 21/02* (2013.01); *G03G 15/5075* (2013.01)
USPC ......................... 358/1.15; 358/1.13; 358/1.14

(58) Field of Classification Search
CPC ..................................................... G06F 3/1264
USPC ......................................................... 358/1.15
See application file for complete search history.

(56) References Cited

U.S. PATENT DOCUMENTS

| | | | | |
|---|---|---|---|---|
| 2002/0075499 | A1* | 6/2002 | Noda | 358/1.14 |
| 2006/0238793 | A1* | 10/2006 | Akashi et al. | 358/1.13 |
| 2008/0154426 | A1* | 6/2008 | Kikuchi | 700/219 |
| 2008/0174825 | A1* | 7/2008 | Hatakeyama | 358/1.18 |

FOREIGN PATENT DOCUMENTS

| | | | |
|---|---|---|---|
| JP | 11-049424 | A | 2/1999 |
| JP | 2005-186521 | A | 7/2005 |
| JP | 2007-196503 | A | 8/2007 |
| JP | 2007-316793 | A | 12/2007 |

* cited by examiner

*Primary Examiner* — Marivelisse Santiago Cordero
*Assistant Examiner* — Aaron R Gerger
(74) *Attorney, Agent, or Firm* — Canon USA, Inc. IP Division

(57) ABSTRACT

An apparatus that creates a print product including a plurality of constituent parts to make a printing result, the apparatus includes a determination unit configured to determine information indicating a discharge unit-number of copies, which is smaller than the designated number of print copies and equal to or larger than 2 copies, when the print product is printed by a plurality number of copies, and a control unit configured to control a printing sequence, so that printing is performed using the determined discharge unit-number of copies as a unit and using the constituent part as a unit in the unit of the discharge unit-number of copies.

9 Claims, 18 Drawing Sheets

FIG.9

PAPER DISCHARGING CAPACITY OF PRINTER

| | |
|---|---|
| MAXIMAL LOADABLE SHEET NUMBER OF PAPER DISCHARGE DESTINATION 1 | 350 SHEETS |
| MAXIMAL LOADABLE SHEET NUMBER OF PAPER DISCHARGE DESTINATION 2 | 250 SHEETS |
| MAXIMAL LOADABLE SHEET NUMBER OF PAPER DISCHARGE DESTINATION 3 | 250 SHEETS |
| MAXIMAL LOADABLE SHEET NUMBER OF PAPER DISCHARGE DESTINATION 4 | 250 SHEETS |
| MAXIMAL LOADABLE SHEET NUMBER OF PAPER DISCHARGE DESTINATION 5 | 250 SHEETS |
| MAXIMAL LOADABLE SHEET NUMBER OF PAPER DISCHARGE DESTINATION 6 | 250 SHEETS |
| MAXIMAL LOADABLE SHEET NUMBER OF PAPER DISCHARGE DESTINATION 7 | 250 SHEETS |
| MAXIMAL LOADABLE SHEET NUMBER OF PAPER DISCHARGE DESTINATION 8 | 250 SHEETS |

FIG.10

PAPER FEEDING CAPACITY OF FINISHER

| | |
|---|---|
| MAXIMAL LOADABLE SHEET NUMBER OF COVER FEED PORT | 100 SHEETS |
| MAXIMAL PROCESSABLE COPY NUMBER OF COVER FEED PORT | 100 COPIES |
| MAXIMAL LOADABLE SHEET NUMBER OF BOOK BLOCK FEED PORT | 500 SHEETS |
| MAXIMAL PROCESSABLE COPY NUMBER OF BOOK BLOCK FEED PORT | 100 COPIES |

INFORMATION PROCESSING APPARATUS AND INFORMATION PROCESSING METHOD

BACKGROUND OF THE INVENTION

1. Field of the Invention

The present invention relates to an information processing apparatus and an information processing method.

2. Description of the Related Art

In a print industry, a print-on-demand (POD) scheme where digital data created from desktop publishing (DTP) is directly printed without a plate-making process has been widely used.

In the POD printing scheme small lot printing or quick delivery is possible and variable printing where printing contents are partially changed is possible.

According to the print industry, printers for the POD have been released from each printer maker. Even in the printers for the POD, in-line finishing where various finishers are mounted and used can be performed. In general, various finishers for the printers for the POD have a higher function than that of finishers of printers for an office.

If the printers for the POD use the in-line finishing, printing and finishing processes are integrated. Therefore, working for extracting paper discharged from the printer and setting the paper to the finisher is not to be performed.

Meanwhile, a finisher that specializes only for the finishing has been widely used in the print industry in these days. In general, a finishing specialized machine has a higher function and can perform a higher-speed operation, as compared to an in-line finisher of the printer for the POD.

Even when it is determined that a finished product is most suitable for the POD printing, if a function or speed is insufficient in the in-line finishing, a printing process is generally executed by a machine for the POD and a finishing process is generally executed by a finishing specialized machine. Such printing scheme is called off-line finishing or near-line finishing (a difference between the off-line finishing and the near-line finishing is described in detail below).

However, since the printing process and the finishing process are individually executed, a printed material that is discharged to a paper discharge destination of a printer is to be carried to a paper feed port of a finisher, which results in causing a load to a worker (user). A method that alleviates the load to the worker is suggested (for example, refer to Japanese Patent Application Laid-Open No. 2005-186521).

When binding printing of a plurality of copies is performed by off-line finishing or near-line finishing, the worker sorts the printed materials discharged to a paper discharge destination of the printer and set the printed materials to the paper feed port of the finisher. More specifically, copies that can be processed by the finisher at a time is to be counted and extracted from a bundle of discharged paper and set the copies to the paper feed port of the finisher.

Further, since an upper limit of a loadable amount exists in the paper discharge destination of the printer, if a loaded amount exceeds the upper limit of the loadable amount in a specific paper discharge destination, the paper discharge destination of the printed materials is switched to another paper discharge destination or the printer stops a printing operation until the paper of the paper discharge destination is removed. When the paper discharge destination is switched to another paper discharge destination, the paper discharge destination is not necessarily switched to another paper discharge destination at a break of the copy.

For this reason, the worker is to search the break of a copy, combine the printed materials discharged to the paper discharge destination, which is in short of a copy, and printed materials discharged to the switched destination to form a copy, and set them to the paper feed port of the finisher.

Similarly, when the printing operation is stopped, for example, after the paper is temporarily removed from the paper discharge destination of the paper, the paper is to be combined with the paper discharged thereafter to form a copy.

Further, when the printing operation is stopped, since the printing operation of the printer is temporarily stopped until the paper of the paper discharge destination is removed, the completion of the printing process delays, and processes including a finishing process that is performed after the printing process delay.

Further, extraction of paper corresponding to a certain number of copies from the paper discharge destination of the printer and setting of the paper to the finisher during the printing are rarely performed, because a load, such as the recognition or count of the copies, is generated to the worker.

In the related art, when printing of a plurality of copies is performed, the printing process and the finishing process can be performed partially in parallel. However, since the printing process and the finishing process are performed in series in consideration of the worker's load, the throughput of the printing and finishing processes cannot be improved.

SUMMARY OF THE INVENTION

According to an aspect of the present invention, an apparatus that creates a print product including a plurality of constituent parts to make a printing result, the apparatus includes a determination unit configured to determine information indicating a discharge unit-number of copies, which is smaller than a designated number of print copies and equal to or larger than 2 copies, when the print product is printed by the plurality number of copies, and a control unit configured to control a printing sequence, so that printing is performed using the determined discharge unit-number of copies as a unit and using the constituent part as a unit in the unit of the discharge unit-number of copies.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates an example of a paper discharging capacity of a printer.

FIG. 10 illustrates an example of a paper feeding capacity of a finisher.

DESCRIPTION OF THE EMBODIMENTS

Various exemplary embodiments, features, and aspects of the invention will be described in detail below with reference to the drawings. It is to be noted that the relative arrangement of the components, the numerical expressions, and numerical values set forth in these exemplary embodiments are not intended to limit the scope of the present invention.

Figure 1:
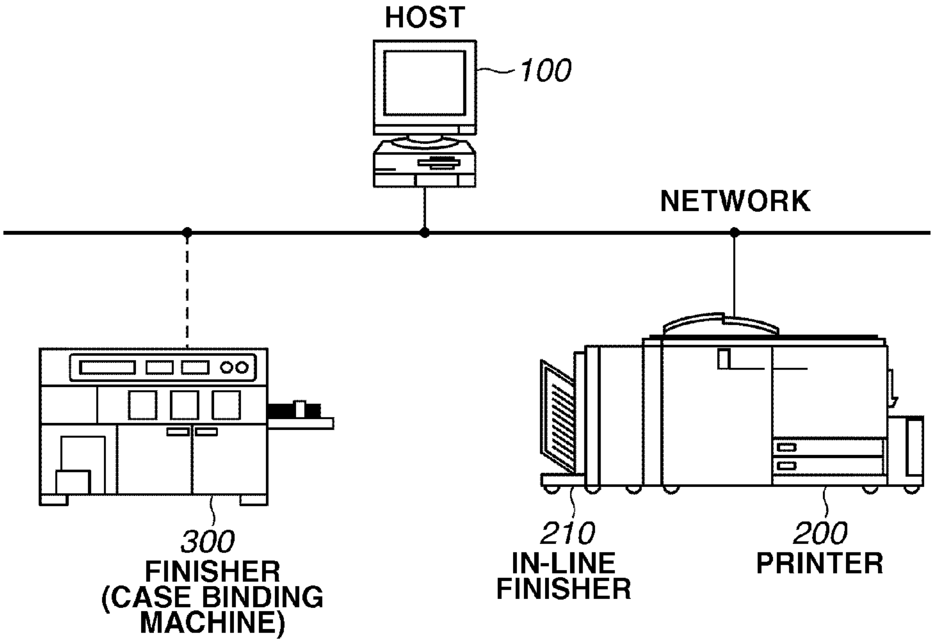
FIG. 1 illustrates an example of the configuration of a printing system.

FIG. 1 illustrates an example of the configuration of a printing system. As illustrated in FIG. 1, in the printing system, a host 100 as an example of an information processing apparatus (computer) and a printer 200 are connected to each other through a communication medium, such as a network. In addition, it is assumed that a finisher 300 (case binding machine) can be used.

Next, in-line finishing, off-line finishing, and near-line finishing will be described. The in-line finishing is a method (or process) that functions in cooperation with a printer, and in which the printer directly controls a finisher to perform finishing.

When a conveyance path of paper of a finisher is connected to a printer and finishing is performed using the finisher that is mountable in the printer, this is called the near-line finishing. Like an in-line finisher 210 of FIG. 1, a finisher that is mounted in the printer 200 is an in-line finisher.

The off-line finishing is a method (or process) in which a printer and a finisher are provided independently from each other, and finishing is performed while a process executed by the finisher is set in the finisher.

The control of the finisher is performed in the finisher. Also, since the conveyance path of paper is independent from the printer, paper that is discharged to the printer is to be carried by, for example, a carrier and set to a paper feed port of the finisher. When finishing is performed using such a finisher, this is called the off-line finishing.

Similar to the off-line finishing, in the near-line finishing, a printer and a finisher are provided independently from each other, and a process executed by the finisher can be controlled from another apparatus on the network other than the finisher. Further, the conveyance path of paper of the off-line finisher is independent from the printer, similar to that in the near-line finishing.

A method (or process) where finishing is performed using near-line finisher is called the near-line finishing. If the finisher 300 of FIG. 1 is connected to another apparatus through a network, the finisher becomes the near-line finisher. If the finisher 300 is not connected to another apparatus, the finisher becomes the off-line finisher.

In the description below, when a finisher is simply described as finisher, this means the near-line finisher or the off-line finisher.

In FIG. 1, if the finisher 300 is connected to the network and can be controlled from a near-line finishing system (not illustrated), near-line finishing is possible.

On the other hand, if the finisher 300 is not connected to the network and is controlled as an independent apparatus, the off-line finishing is possible. Each of the in-line finisher 210 and the finisher 300 is an example of a post-processing device that performs post-processing on the printing result.

Figure 2:
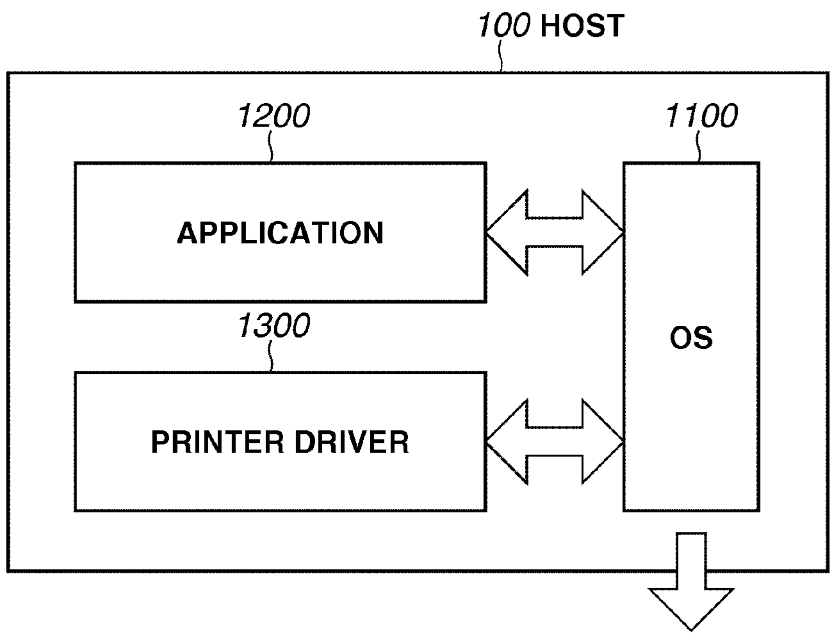
FIG. 2 illustrates an example of the configuration of a host.

FIG. 2 illustrates an example of the configuration of the host 100. The host 100 includes an arithmetic processing unit, such as a central processing unit (CPU), and a storage device, such as a hard disk or a memory. Further, the host 100 includes hardware of a display device, such as a display, or an input device, such as a keyboard or a mouse.

Further, the host 100 includes an operating system (OS) 1100, an application 1200 for printing a document, and a printer driver 1300 that converts print setting or drawing contents into print data of a format processable by the printer 200 via the OS. In this case, the document is an example of a print product.

The printer 200 of FIG. 1 is configured to allow paper discharge to paper discharge destinations, such as a plurality of trays. The printer 200 can perform a ordinary printing, and discharge a printed material to a paper discharge destination, which is designated according to contents of print data delivered from the host 100.

The finisher 300 of FIG. 1 is a case binding machine in the present exemplary embodiment, and includes a mechanism for setting bookblock stacks to be bound and a case-binding cover to different paper feed ports, respectively.

Figure 3:
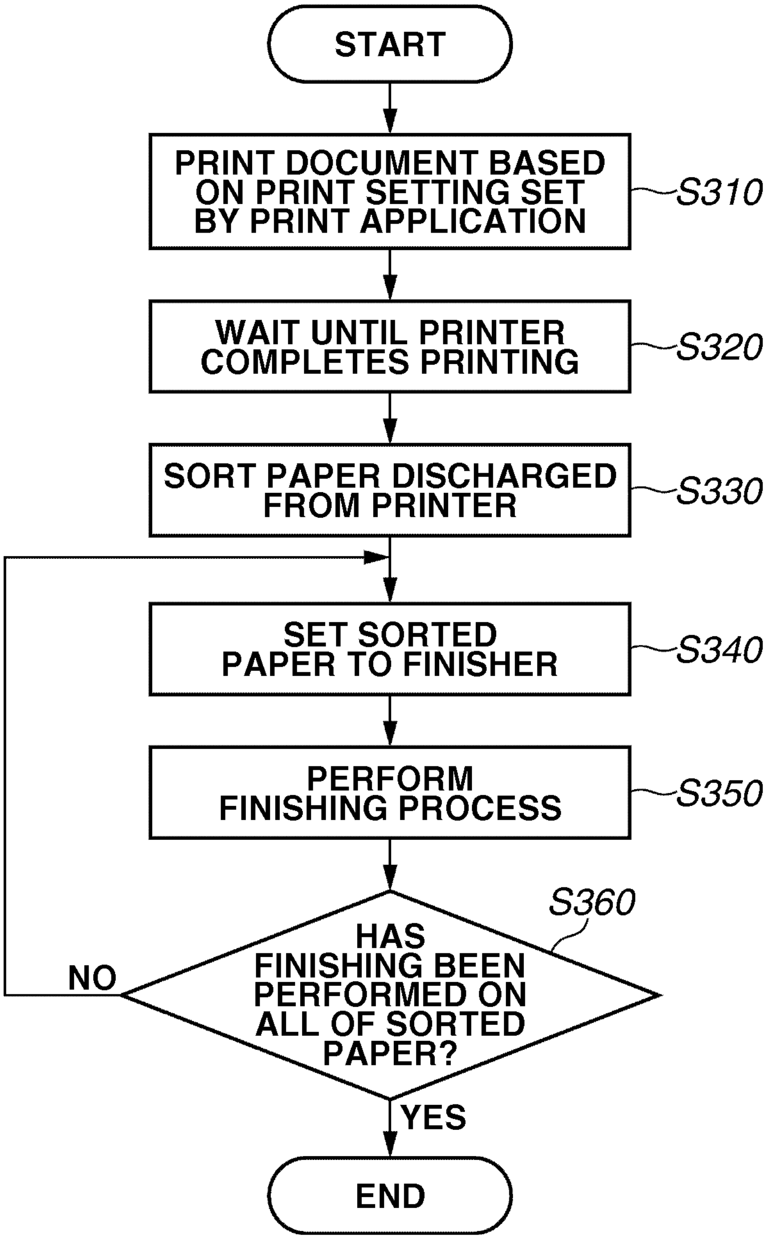
FIG. 3 is a flowchart illustrating a process of a worker of off-line finishing in the related art.

Next, a process that is performed by a worker (user) of off-line finishing implemented conventionally will be described with reference to FIG. 3. FIG. 3 is a flowchart illustrating a process of a worker of off-line finishing heretofore.

In step S310 (i.e., print document based on print setting set by print application), the worker performs print setting from a print application and instructs printing of target documents. Next, in step S320 (i.e., wait until printer completes printing), the worker waits until all of the instructed documents are discharged from the printer 200. Next, in step S330, the worker sorts the discharged paper from printer, when all of the paper sheets are discharged.

For example, if the cover and bookblock for the case binding are discharged to the same paper discharge destination in this order, the worker sorts the discharged paper sheets into the cover and the bookblock.

At this time, when the paper sheets are divisionally discharged to the plurality of paper discharge destinations due to the restriction of the paper discharge destinations of the printer, the break of the paper discharge destinations is not equal to the break of the copies. For this reason, the worker stacks the paper discharged in the order where the printer switches the paper discharge destinations.

Next, in step S340 (i.e., set sorted paper to finisher), the worker sets the cover and the bookblock to the paper feed port of the finisher 300 according to the paper loading restriction of the finisher 300, which performs finishing of the case binding. In this case, the worker sets the paper according to the feeding restriction of the finisher 300.

For example, in the case of the cover, paper can be set to the paper feed port up to 100 sheets (copies) at a time, but in the case of the bookblock, the paper can be set to the paper feed port up to any one of the smaller number of 10 copies or 500 sheets. Accordingly, the paper is to be set according to the finisher to be used.

For example, when 50 copies of binding including 60 page bookblock stack are performed, covers for 50 copies can be set at a time. However, since the 10 copies of bookblock stacks include 600 sheets. Thus, it exceeds the paper feeding restriction. For this reason, only the paper sheets for 8 copies (60×8=480), which does not exceed 500 sheets, can be set at a time.

In the above example, since finishing of all copies cannot be completed at a time (NO in step S360), the worker repeats the operation of setting the bookblock stacks. Accordingly, since the worker is to consider contents of the printed material and the restriction of the finisher, the worker is to set paper while counting the copy number of the block stack. In step S350 (i.e., perform finishing process), if the paper is set, the worker operates the finisher 300 and executes finishing. The process then continue with step S360 where it is determined finishing has been perform on all sorted paper. If the finishing has been performed (YES in step S360), the process is terminated. If not (NO in step S360), as stated above, the process goes back to step S340.

Figure 4:
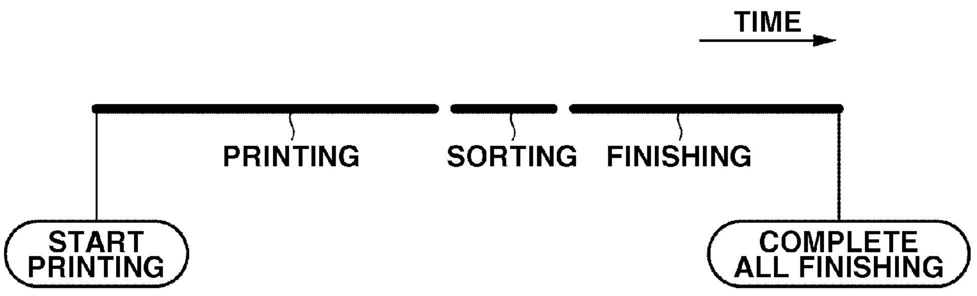
FIG. 4 illustrates a temporal change of a process of FIG. 3.

FIG. 4 illustrates a temporal change of a process of FIG. 3. As illustrated in FIG. 4, the worker performs the sorting after the printing process is completed, and performs the finishing process thereafter. Therefore, longer time is used until the finishing is completed after the printing starts.

Figure 5:
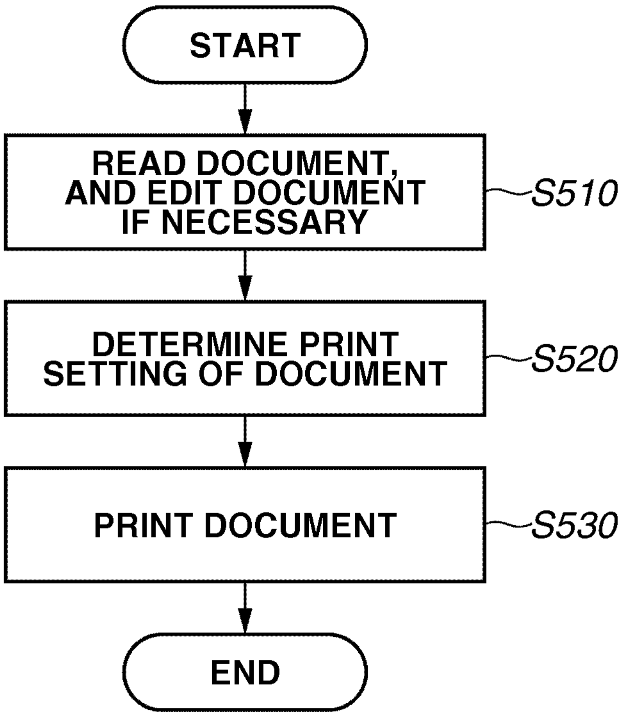
FIG. 5 is a flowchart illustrating an example of an application process on a host.

FIG. 5 is a flowchart illustrating an example of a process of an application 1200 on a host 100. In step S510 (i.e., read document and edit document), based on the operation instruction from the worker, the application 1200 opens a document for editing and printing, and performs the editing work. Next, in step S520, the application 1200 determines print setting of the document, based on the editing operation instruction from the worker. The process continues with step S530 where the document is printed. The process is then terminated.

Figure 6:
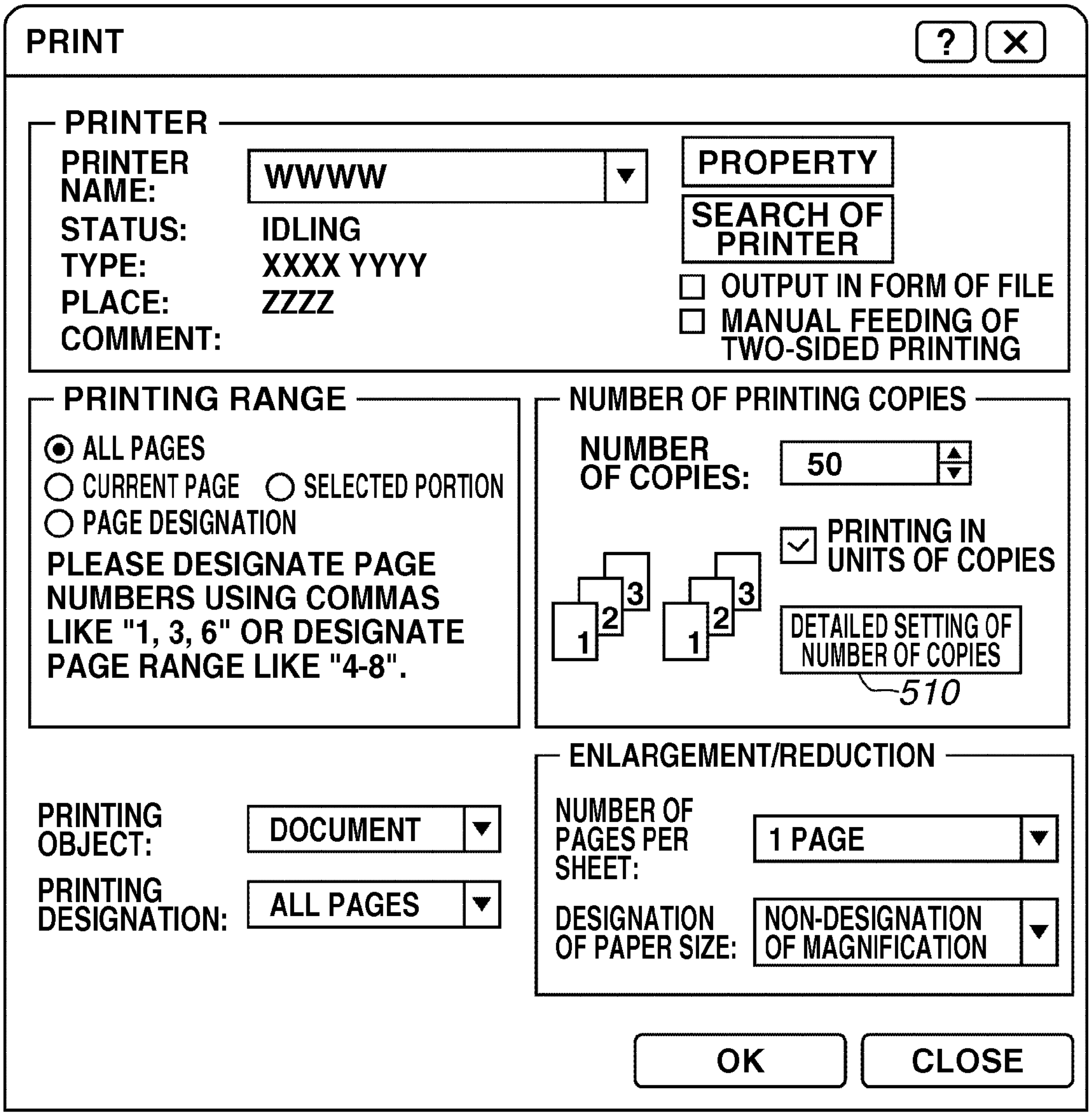
FIG. 6 illustrates an example of a print setting screen.

FIG. 6 illustrates an example of a print setting screen. The worker sets a printer to perform printing or the number of copies to be printed in the print setting screen. In the present exemplary embodiment, setting of number of copies is extended, and a detailed setting of number of copies button 510 is disposed as illustrated in FIG. 6. If the worker presses the detailed setting of number of copies button 510, a dialogue illustrated in FIGS. 7 and 8 is displayed.

In the present exemplary embodiment, the application 1200 sets (or controls) to divide printing corresponding to the number of copies (a plurality of copies) designated in the print setting dialogue illustrated in FIG. 6 into a unit of the discharge unit-number of copies and repetitively perform printing.

For example, when the number of print copies is 50 and the discharge unit-number of copies is 8, the application 1200 repeats printing of 8 copies to print a total of 50 copies.

Figure 7:
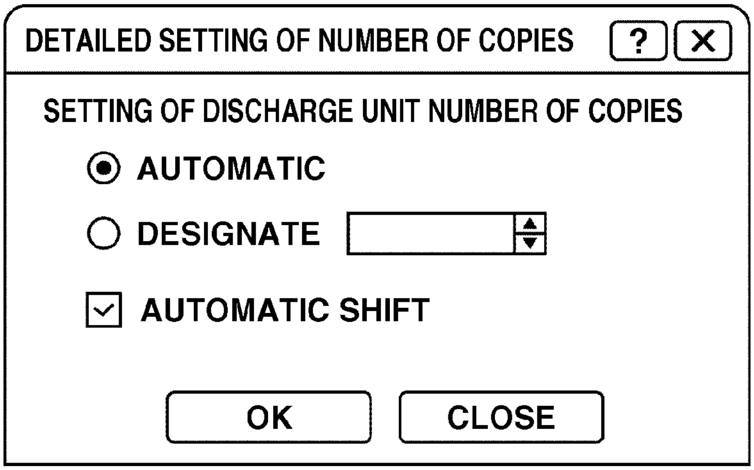
FIG. 7 illustrates an example of a selection screen for determining the discharge unit-number of copies.
Figure 8:
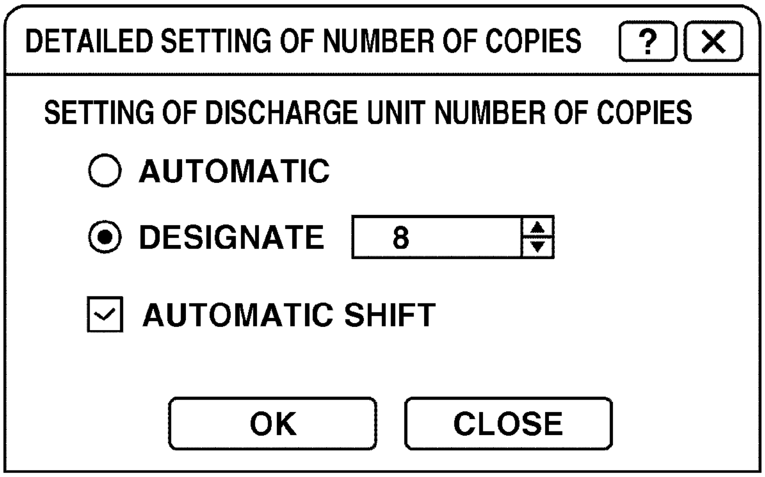
FIG. 8 illustrates an example of a selection screen for determining the discharge unit-number of copies.

FIGS. 7 and 8 illustrate an example of a selection screen of a method for determining the discharge unit-number of copies. In the selection screen illustrated in FIGS. 7 and 8, the worker can select "automatic" where a value most suitable for a document, a printer, or finisher to be used can be set, or "designate" where the user (worker) can set an arbitrary value. A method for determining the discharge unit-number of copies will be described in detail below.

In the dialogue (screen) illustrated in FIGS. 7 and 8, the user can designate whether to perform an automatic shift. For example, there is a desktop bookbinding machine that can feed the cover and the bookblock stack by one copy, in the finishing of the book binding.

If the present exemplary embodiment is applied to the system using the finisher, the discharge unit-number of copies is one copy. The cover and the bookblock stack are discharged by one copy to different paper discharge destinations, respectively.

In the case of the paper discharge control, if printing of a large number of copies (a plurality of copies) is performed, since the worker frequently performs the work for extracting the paper (printing result) discharged form the paper discharge destination of each of the cover and the bookblock stack, the work efficiency of the worker may be lowered. Therefore, an "automatic shift" function is provided to suppress an adverse effect.

In the automatic shift function, using the shift function (function of alternately shifting a discharge location in the paper discharge destination for each copy) of the printer, the discharged paper in the paper discharge destination of the printer is shifted to each other for each copy. If the automatic shift function is used, the worker can more easily recognize the unit of copies, and the feeding work can be easily performed for the desktop bookbinding machine. The printing operation when the automatic shift function is designated will be described in detail below.

As illustrated in FIG. 7, capacities of the printer and the finisher are to determine the discharge unit-number of copies, when the discharge unit-number of copies is set as "automatic", will be described below. FIG. 9 illustrates an example of a paper discharge capacity of a printer as an example of capacity information of paper discharge.

The application 1200 has information of the maximum loadable sheet number for each paper discharge destination where the printer can discharge paper to calculate the discharge unit-number of copies. These values may be obtained from the application 1200 that has a constant number set for every each printer. Alternatively, the application 1200 may inquire the printer 200 of the values through two-way communication and acquire the values.

If the printer driver 1300 holds the values, the application 1200 may acquire the values from the printer driver 1300. A method for acquiring the capacity value does not limit the present exemplary embodiment.

FIG. 10 illustrates an example of a feeding capacity of a finisher 300 as an example of capacity information of paper feeding.

Similar to the example of the printer described above, the application 1200 has information of the maximum number of copies and the maximum number of sheets that can be fed to each paper feed port of the target finisher at a time, to calculate the discharge unit-number of copies. In the present exemplary embodiment, since the bookbinding machine is used, the fed paper sheets are the cover and the bookblock stack. Therefore, the information of the maximum copy number and the maximum sheet number of the paper feed port are used.

Figure 11:
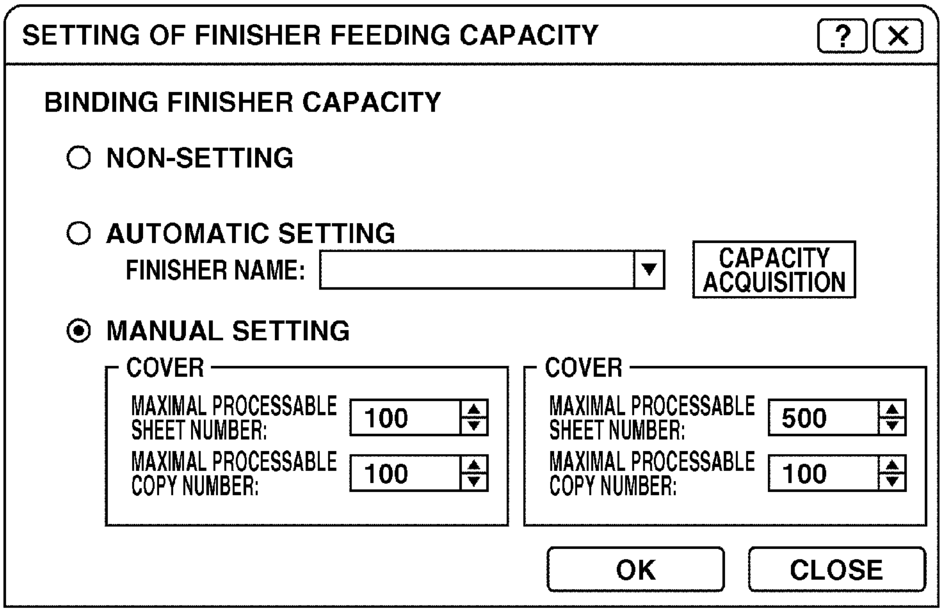
FIG. 11 illustrates an example of a paper feeding capacity of a finisher.

Further, this information may be statically stored in the application 1200 as a capacity of the corresponding finisher 300 and may be acquired therefrom. Further, according to the instruction from the worker, the application 1200 may display a dialogue illustrated in FIG. 11, and the worker may select any one of "non-setting", "automatic setting", and "manual setting".

In the case of "non-setting", the capacity of the paper feeding of the finisher does not contribute to a determination of the discharge unit-number of copies.

In the case of "automatic setting", the application 1200 designates a finisher name existing on the system according to the instruction from the worker, and directly or indirectly acquires the capacity from the finisher. To use this option, like the near-line finishing, the finisher 300 is to be connected to the host 100 through any communication medium.

In the case of "manual setting", the worker can input a restriction value related to the finisher, through the screen.

As described above, in step S530 of FIG. 5, the application 1200 executes the print setting process and acquires the capacities of the printer and the finisher. Then, the application 1200 executes a printing process (printing control process).

Figure 12:
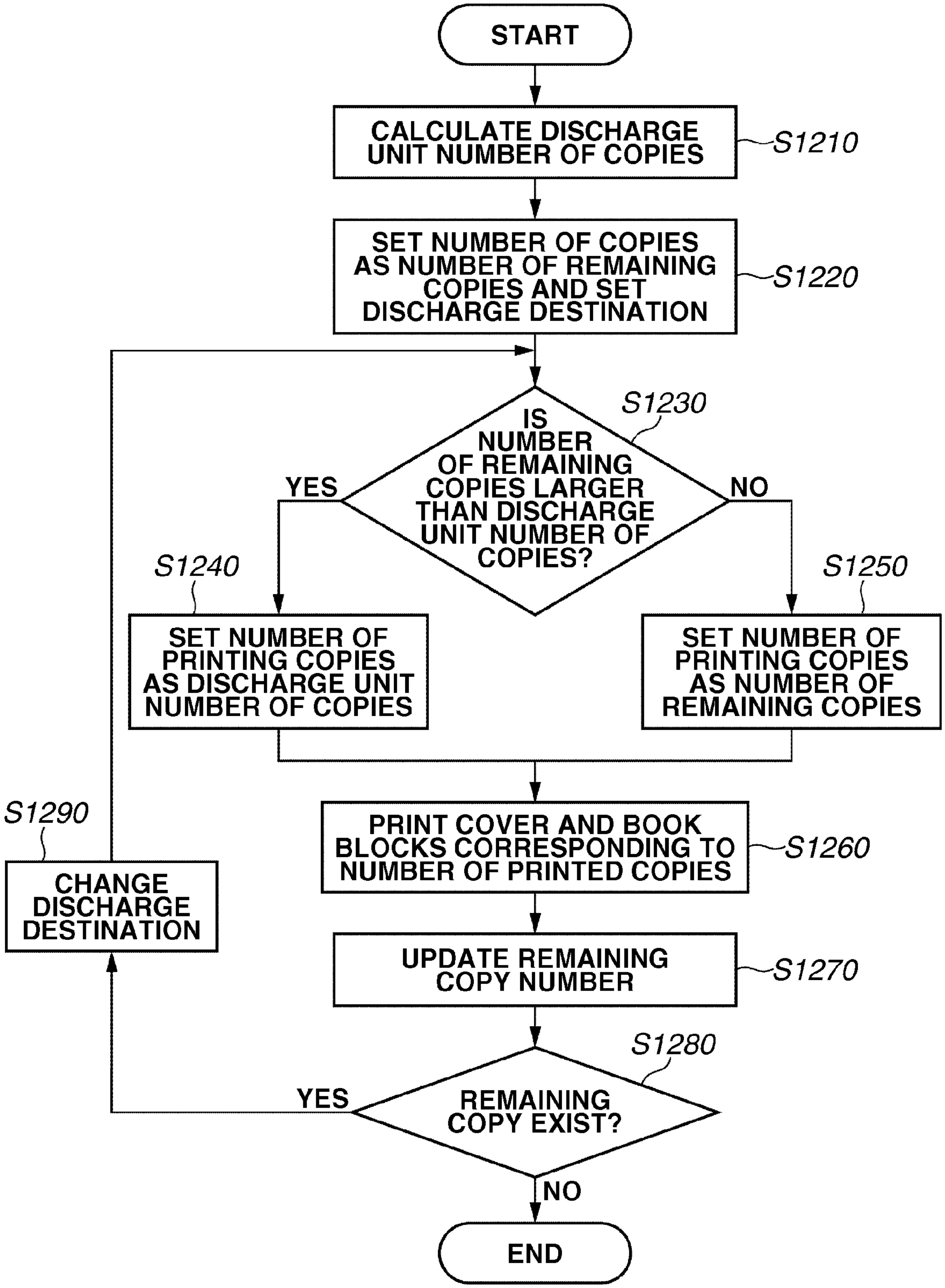
FIG. 12 is a flowchart illustrating an example of a print setting process of an application.

FIG. 12 is a flowchart illustrating an example of a print setting process of the application 1200.

In step S1210, the application 1200 calculates the discharge unit-number of copies. The process of step S1210 will be described in detail below with reference to FIG. 13.

After the discharge unit-number of copies is determined in step S1210, the application 1200 sets the copy number designated via the print setting screen as the remaining copy number, and determines/sets the paper discharge destinations of the cover and the bookblock stack in step S1220. The application 1200 differently sets available paper discharge destinations among the paper discharge destinations as the destination of the cover and the destination of the bookblock stack.

Next, in step S1230, the application 1200 checks whether the remaining copy number is larger than the previously calculated discharge unit-number of copies. When the remaining copy number is larger than the previously calculated discharge unit-number of copies (YES in step S1230), in step S1240, the application 1200 sets the current number of copies to be as the discharge unit-number of copies.

When the remaining copy number is smaller than or equal to the discharge unit-number of copies (NO in step S1230), in step S1250, the application 1200 sets the current number of copies to be printed as the remaining copy number. Next, in step S1260, the application 1200 performs a printing process corresponding to the number of copies to be printed.

In step S1260, the application 1200 performs a control operation, such that the covers are discharged to the paper discharge destination set as the paper discharge destination of the covers and the bookblock stacks are discharged to the paper discharge destination set as the paper discharge destination of the bookblock stacks by the current number of printed copies.

Meanwhile, when the shift function is instructed, the shift function is validated. The printing order of the cover and the bookblock or the repetitive unit of copies (the covers and the bookblock stacks are repeated respectively or a set of a cover and a bookblock stack is repeated) does not limit the present exemplary embodiment.

In this way, after the printing process for the number of printed copies is completed, in step S1270, the application 1200 performs an updating process of the remaining copy number. The new remaining copy number is obtained by subtracting the number of printed copies from the current remaining copy number.

Next, in step S1280, the application 1200 checks whether the remaining copy exists. When the remaining copy exists (YES in step S1280), the application 1200 proceeds the processing to step S1290 and changes the paper discharge destination that is set to each of the cover and the bookblock stack.

The application 1200 sets the new paper discharge destinations so that the paper discharge destinations are different from the currently set paper discharge destinations and different for each of the cover and the bookblock stack (i.e., for each individual constituent part).

For example, when the cover and the bookblock stack are printed in the printer having 8 paper discharge destinations, the application 1200 uses the paper discharge destinations 1 and 2 for the printing of the first set, the paper discharge destinations 3 and 4 for the printing of the second set, the paper discharge destinations 5 and 6 for the printing of the third set, and the paper discharge destinations 7 and 8 for the printing of the fourth set. Further, when the printing of the fifth set is performed, the application 1200 determines the paper discharge destinations by a round-robin method to be the paper discharge destinations 1 and 2.

Next, the processing returns to step S1230, and application 1200 repeats the process until the remaining copy number becomes zero (NO in step S1280). The process is then terminated.

Figure 13:
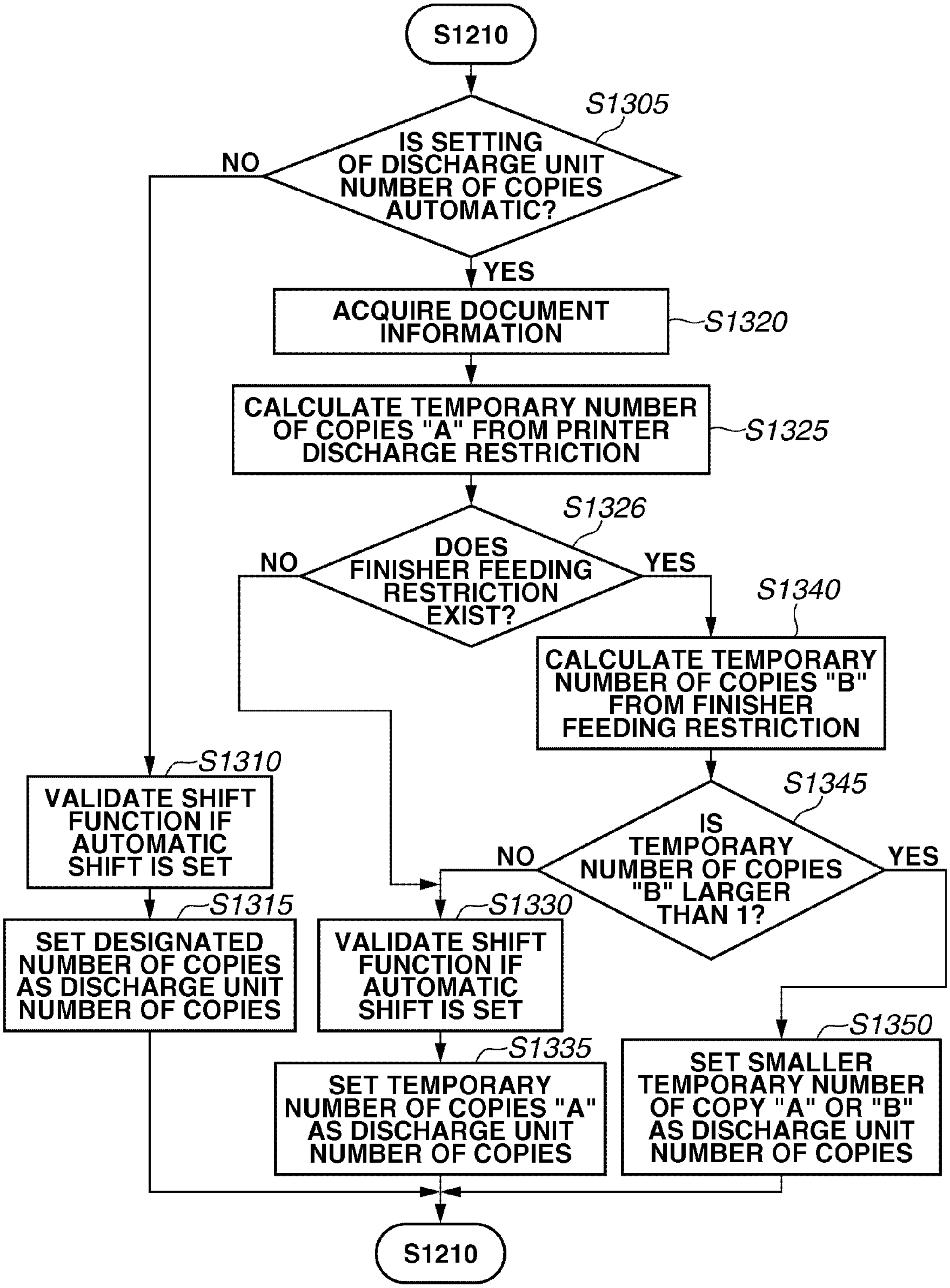
FIG. 13 is a flowchart illustrating an example of a process of calculating the discharge unit-number of copies.

FIG. 13 is a flowchart illustrating an example of a process of calculating the discharge unit-number of copies (step S1210 if FIG. 12).

In step S1305, the application 1200 checks whether the discharge unit copy number setting in the detailed setting of number of copies of the print setting, illustrated in FIG. 7 or 8, is "automatic". If the discharge unit copy number setting is not "automatic" (NO in step S1305), the processing proceeds to step S1310. The application 1200 checks whether the "automatic shift" is set in the detailed setting of number of copies, and validates the above-described shift function, if the "automatic shift" is set.

Next, in step S1315, the application 1200 sets the copy number, which is set by the worker via the application in the detailed setting of number of copies, as the discharge unit-number of copies.

If the "automatic" is set in step S1305 (YES in step S1305), the application 1200 acquires the document information (step S1320). In this step, the application 1200 acquires the number of pages of the cover of the document (the print object) and the number of pages of the bookblock stack (i.e., acquisition of the number of pages).

Next, in step S1325 (i.e., calculate temporary number of copies "A" from printer discharge restriction), the application 1200 acquires the discharging capacity of the printer (acquisition of printing device capacity information), and calculates the temporary copy number "A" (first unit copy number), based on the number of pages of the individual constituent parts and the discharging capacity of the printer.

The application 1200 determines the temporary copy number A, so that the constituent parts of the page number of the large side between the page number of the cover and the page number of the bookblock stack previously calculated in step S1320 can be discharged to the paper discharge destination having the smallest maximum loaded sheet number among the used paper discharge destinations, without the break of the copy during the discharge.

For example, the printing where the cover of 1 page and the bookblock stack of 60 pages are output to the printer having the discharging capacity illustrated in the example of FIG. 9 will be exemplified.

If the 60 pages of the bookblock stack having the larger number of pages are discharged to any one of the paper discharge destinations 2 to 8 where the maximum loaded sheet number is minimal, that is, 250 pages, 4 copies (250/60=4, remainder=10) can be discharged to the same paper discharge destination without the break of the copies during the discharge. For this reason, the application 1200 sets the temporary copy number A as 4.

Next, in step S1326, the application 1200 checks whether the feeding restriction of the finisher is set. When the "non-setting" is designated in the setting screen illustrated in FIG. 10 (NO in step S1326), the application 1200 determines that the restriction of the finisher is not set, and then the processing/application 1200 proceeds to step S1330.

In step S1330, the application 1200 checks whether the "automatic shift" is set in the detailed setting of number of copies, and validates the above-described shift function, if the "automatic shift" is set. Next, in step S1335, the application 1200 sets the previously determined temporary copy number A as the discharge unit-number of copies.

When it is determined that the restriction of the finisher is set in step S1326 (YES in step S1326), the processing proceeds to step S1340. In step S1340, the application 1200 acquires the feeding capacity of the finisher (acquisition of capacity information of the post-processing device), and calculates the temporary copy number "B" (second unit copy number), based on the number of pages of the individual constituent parts and the feeding capacity of the finisher.

The application 1200 refers to the page number of the cover and the page number of the bookblock stack previously calculated in step S1320, calculates the maximum loadable sheet number of the paper feed port and the maximum copy number not exceeding the processable copy number for the individual constituent elements, and determines the temporary copy number B as the smallest number among the calculated copy numbers.

For example, the case where bookbinding including the cover of 1 page and the bookblock stack of 60 pages undergoes finishing by the bookbinding machine having the feeding capacity illustrated in the example of FIG. 10 will be exemplified. Since the cover is 1 page, a maximum of 100 pages and 100 copies can be fed, referring to the restriction of the paper feed port of the cover.

Since the bookblock stack includes 60 pages, the bookblock stacks corresponding to 8 copies (500/60=8, remainder=20) can be fed to the paper feed port of the bookblock stacks, and the copy number does not exceed the maximum processable copy number 100 of the paper feed port of the bookblock stacks. Therefore, the feedable copy number of the bookblock stacks is 8. Since the cover of 100 copies and the bookblock of 8 copies can be fed, the application 1200 sets 8 copies corresponding to the smaller number as the temporary copy number B.

Next, the application 1200 checks whether the temporary copy number "B" determined in step S1345 is larger than 1. When the temporary copy number "B" is 1 (NO in step S1345), the processing proceeds to step S1330, and sets a shift function. Then, in step S1335, the application 1200 sets the discharge unit-number of copies as the previously calculated temporary copy number "A".

When the temporary copy number B is larger than 1 (YES in step S1345), the processing proceeds to step S1350. The application 1200 compares the temporary copy number "A" and the temporary copy number B with each other and sets the smaller number as the discharge unit-number of copies. In this way, the application 1200 determines the discharge unit-number of copies.

According to the present exemplary embodiment, when printing of a plurality of copies is performed for the print product, the application 1200 divides the designated number of print copies into the discharge unit-number of copies that has a smaller number than the copy number. In addition, the application 1200 performs printing according to the divided discharge unit-number of copies, and performs print setting such that the printing result is output to the paper discharge destination different for a type of each constituent part.

Further, when the application 1200 performs print setting such that the printing result is output to the different paper discharge destination according to the type of each constituent part, the application 200 may perform the print setting such that the printing result is output to the paper discharge destination different from the paper discharge destination that was set just before.

Based on the number of pages of the individual constituent parts and the capacity information for each paper feeding of the printer 200, the application 1200 may divide the number of print copies as follows. That is, when the printing result of the constituent parts having the maximum number of pages is output to the paper discharge destination having the smallest loaded sheet number among the paper discharge destinations of the printer 200, the application 1200 may set the maximum copy number not exceeding the loaded sheet number as the discharge unit-number of copies.

Further, based on the number of pages of the individual constituent parts and the capacity information for each paper feeding of the finisher, the application 1200 may divide the number of print copies as follows.

That is, when the printing result of the constituent parts having the maximum number of pages is output to the paper discharge destination, the application 1200 may divide the printing result of the constituent parts into the number of print copies designated by the discharge unit-number of copies, which is the maximum copy number not exceeding the loadable sheet number of the paper feed port of the finisher. The application 1200 may set the processable copy number as the discharge unit-number of copies, when the discharge unit-number of copies of the divided result is larger than the copy number processable by the finisher at a time.

Figure 14:
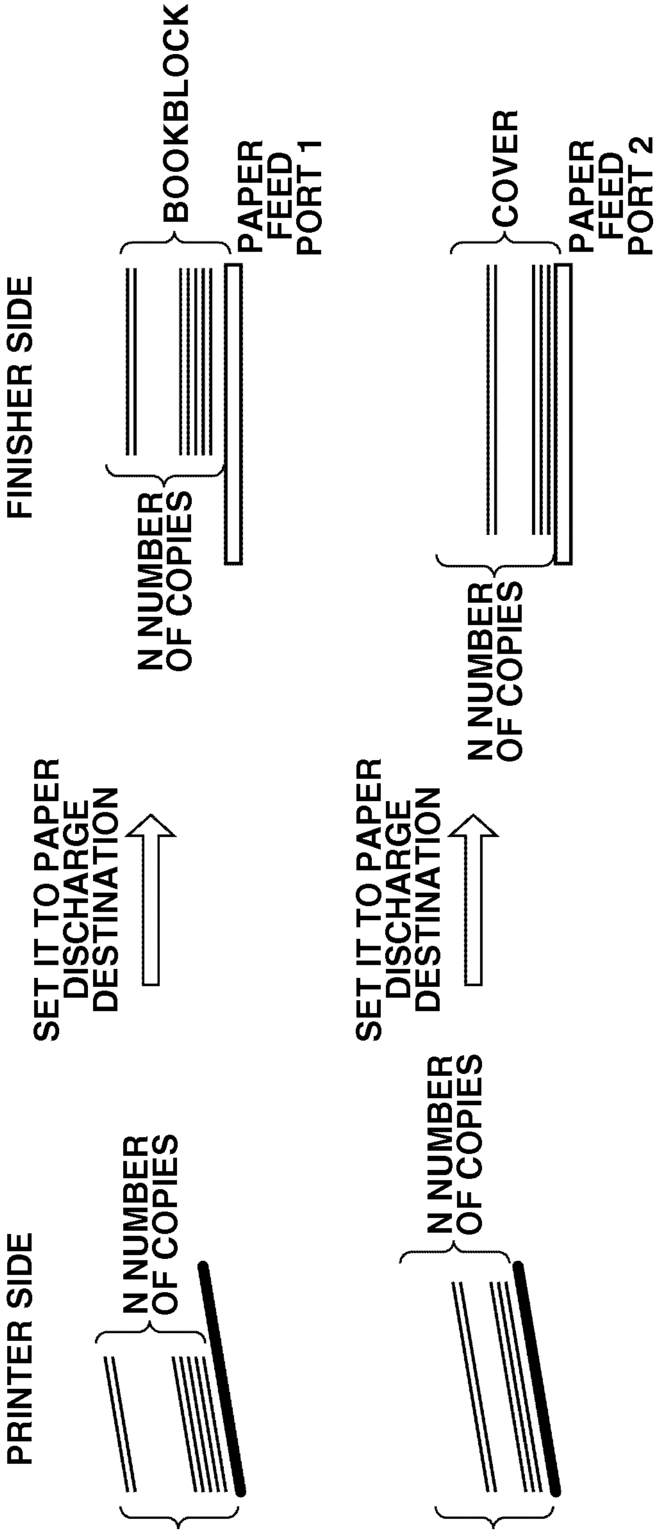
FIG. 14 illustrates an example of discharging paper for the unit number of copies to each paper discharge destination.

If the present exemplary embodiment is applied, as illustrated in FIG. 14, each of the parts constituting the printed material (printing result) such as the cover or the bookblock is discharged to a different paper discharge destination of the printer. The worker who feeds the paper to the finisher does not perform the work for extracting each constituent part from one set of printed materials, and arranging each constituent part.

Further, since the bundle of constituent parts of the printed material that is discharged to each paper discharge destination can be fed to the finisher as it is, the work for counting the copies that the worker performs to feed the paper to the finisher is not to be performed.

Figure 15:
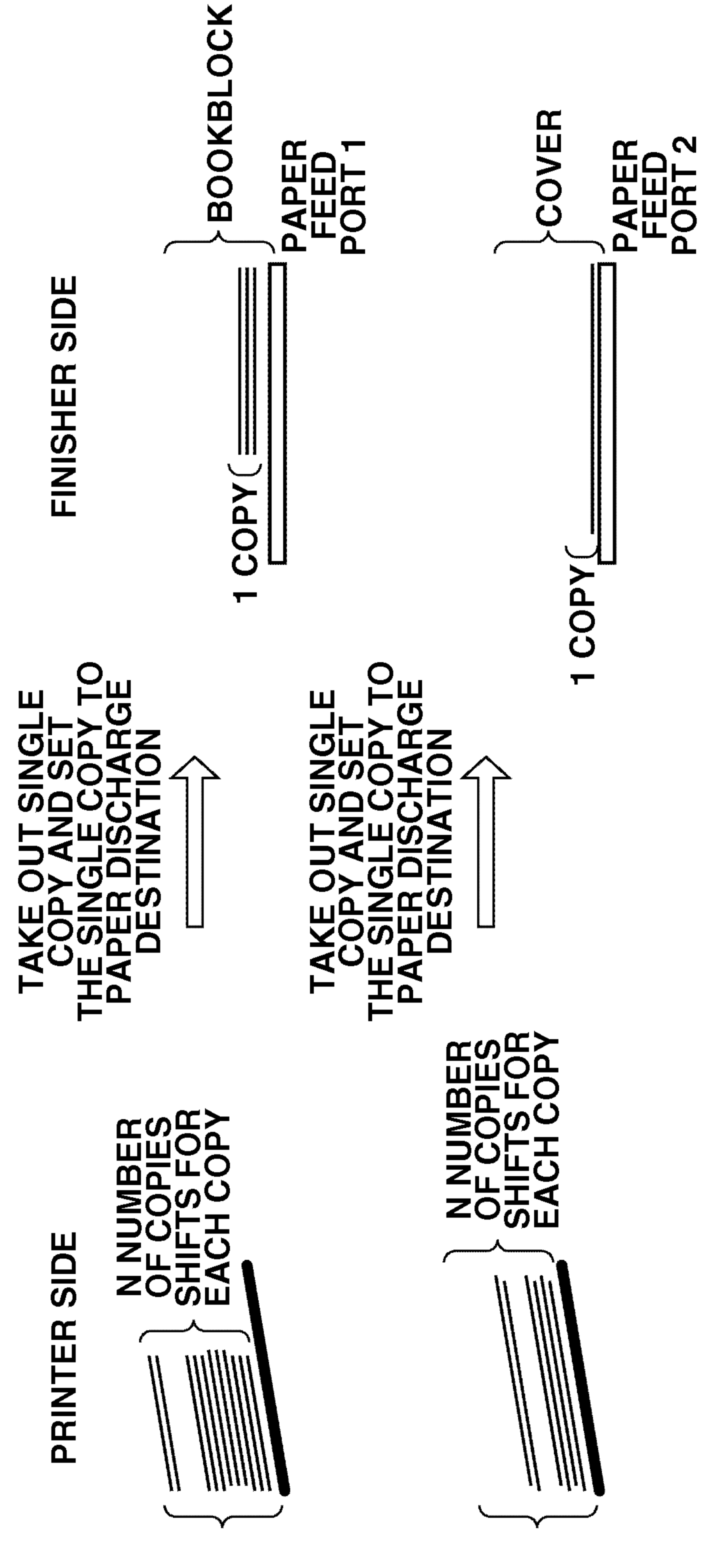
FIG. 15 illustrates an example of a shift function.

Even when the number of copies that can be fed to the finisher is 1, each constituent part of the printed material that is discharged to the paper discharge destination of the printer is shifted for each copy, as illustrated in FIG. 15.

For this reason, the worker can easily extract one copy from the bundle discharged to the paper discharge destination of the printer and the load of the worker when sorting is reduced as compared to that of the related art.

Figure 16:
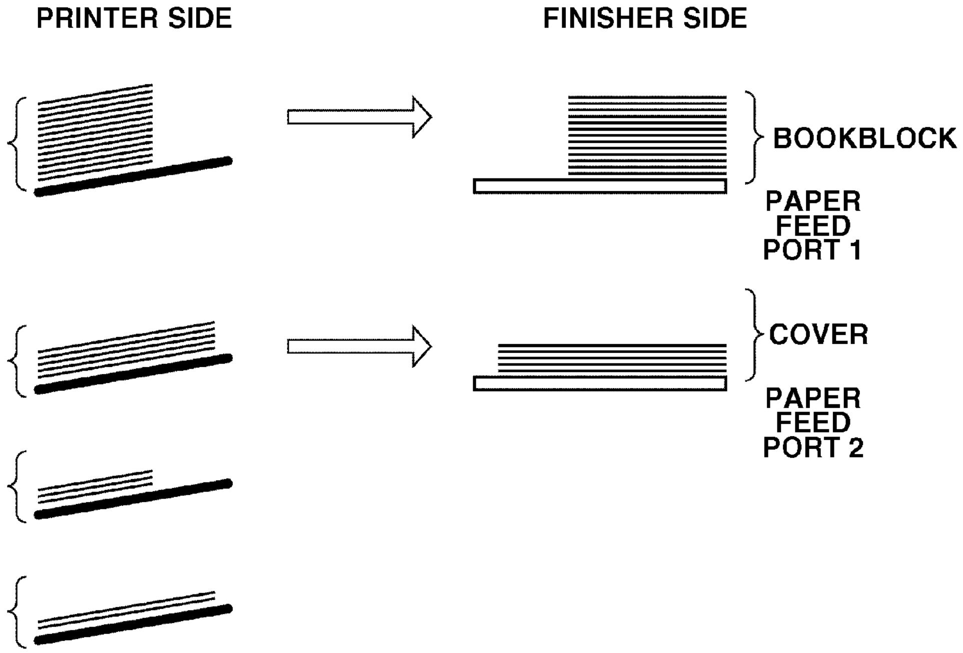
FIG. 16 illustrates an example of switching a paper discharge destination for each discharge unit-number of copies.

Further, when printing of the large number of copies is performed using the printer that has the paper discharge destinations at least two times larger than the number of constituent parts of the document, as illustrated in FIG. 16, the constituent parts having discharged at the paper discharge destination can be fed to the paper feed port of the finisher.

Figure 17:
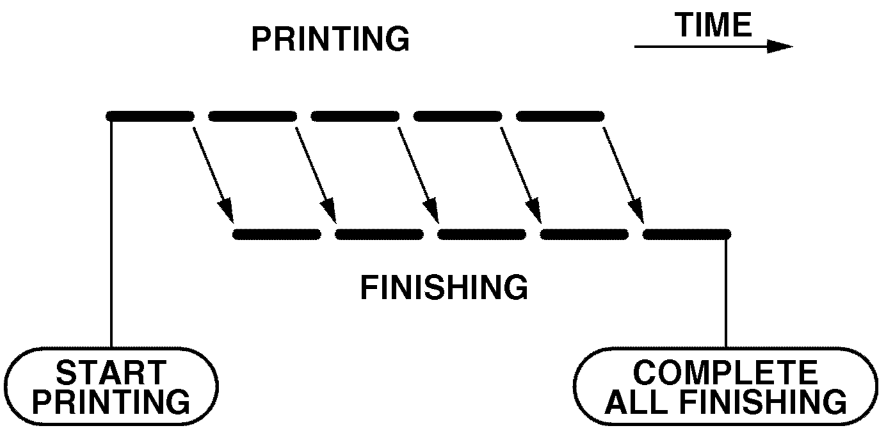
FIG. 17 illustrates an example of a process change time chart according to an exemplary embodiment.

For this reason, as illustrated in FIG. 17, the printing process and the finishing process can be performed in parallel, and the overall throughput of the printing and finishing processes can be improved.

The case where the binding finishing is performed on the document having the two constituent parts (the cover and the bookblock) has been exemplified. However, the present exemplary embodiment can be implemented if the number of constituent parts of the document is more than one, and the finishing method is also not limited to the case binding.

Figure 18:
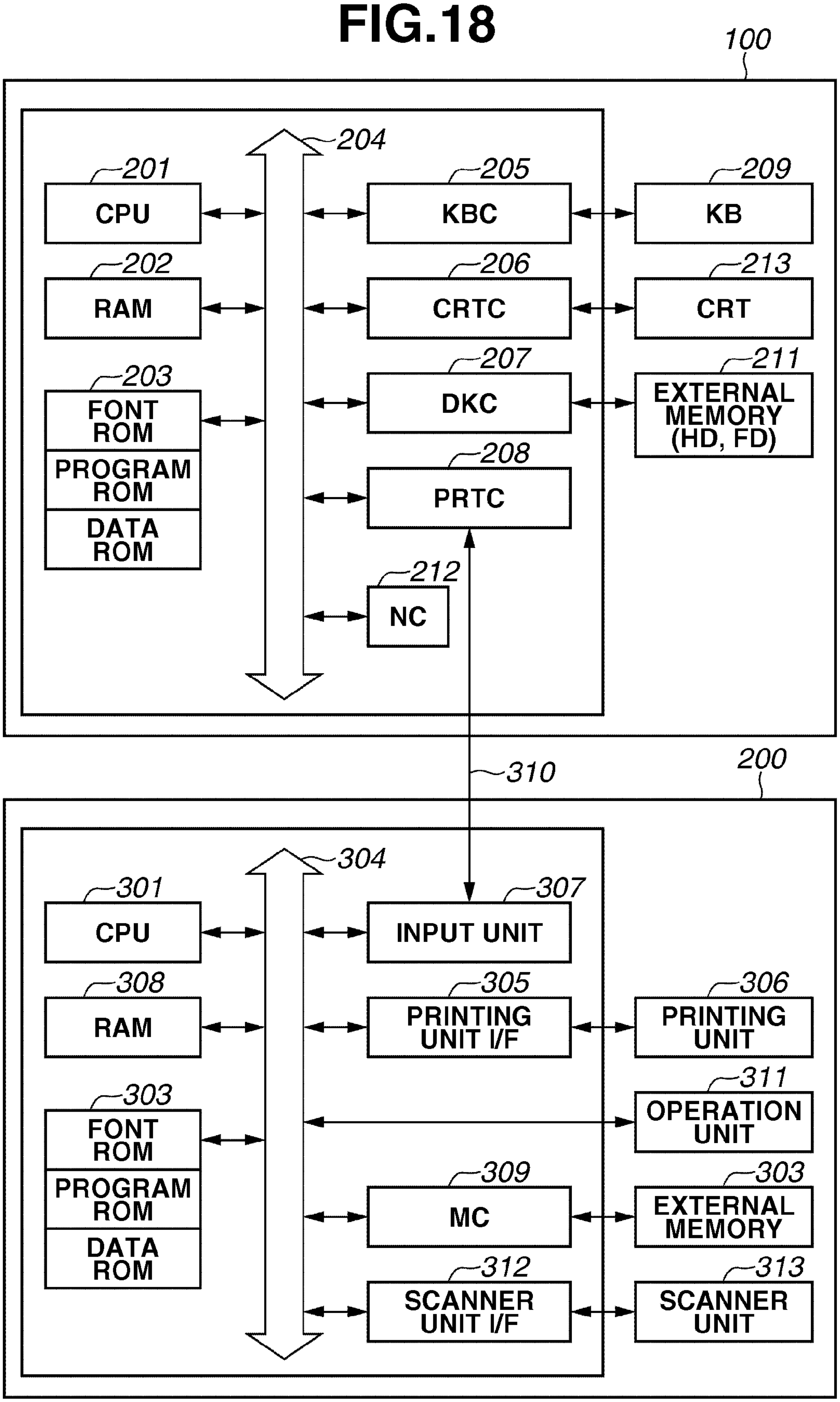
FIG. 18 illustrates an example of the hardware configuration of a host and a printer.

FIG. 18 illustrates an example of a hardware configuration of a host 100 and a printer 200.

In this case, the host 100 indicates a computer that constitutes a Web application server 1001, and the printer 200 indicates a computer that constitutes an output device 1002.

First, the configuration of the host 100 will be described. The hardware configuration illustrated in FIG. 18 corresponds to the hardware configuration of a general information processing apparatus, and the hardware configuration of the general information processing apparatus can be applied to the host 100 according to the present exemplary embodiment.

In FIG. 18, a CPU 201 executes a program of an operating system (OS) or an application program stored in a program read only memory (ROM including font ROM, program ROM, and data ROM) 203, or from an external memory (i.e., hard disk (HD), FD) 211 to a random access memory (RAM) 202.

The process of each flowchart that will be described in detail below is executed by the CPU 201 based on a program. The RAM 202 functions as a main memory or a work area for the CPU 201.

A keyboard controller (KBC) 205 controls a key input entered from a keyboard 209 or a pointing device (not illustrated). A cathode ray tube controller (CRTC) 206 controls display of a CRT display 213. A disk controller (DKC) 207 controls data accesses in the hard disk (HD) 211 that stores a variety of data or a floppy (registered trademark) disk (FD).

A PRTC 208 controls an exchange of signals with the connected printer 200. A connection line 310 may employ various connection forms, such as a local area network (LAN) or a universal serial bus (USB). An NC 212 is connected to a network, and executes a communication control process with another apparatus connected to the network. In this case, the NC 212 may be connected to another printer and a peripheral apparatus through the network.

The host 100 has been described as the computer constituting the Web application server 1001, but may be a computer constituting a client terminal 1003.

Next, the configuration of the printer 200 will be described. As illustrated in FIG. 18, in the printer 200, a CPU 301 that is included in the printer 200 controls each block connected to a system bus 304, based on a control program that is stored in a ROM 302 or an external memory 303.

An image signal that is generated by the process of the CPU 301 is output as output information to a printing unit (printer engine) 306, through an input unit I/F 305. Further, the CPU 301 can execute a communication process with the host 100 through an input unit 307, and notify the host 100 of information in the printer 200.

The printing unit 306 can connect option hardware (e.g., finisher), which is not illustrated, and expand a function. Also, the printing unit 306 can detect existence/non-existence or performance of the option hardware.

The program ROM in the ROM 302 stores a control program of the CPU 301. A font ROM in the ROM 302 stores font data that is used when output information is generated. A data ROM in the ROM 302 stores information that is used on the host 100, for the printer not having an external memory 303, such as a hard disk.

A RAM 308 functions as a main memory or the work area of the CPU 301. The RAM 308 is configured such that a capacity of a memory can be expanded by an option RAM connected to an expanding port (not illustrated). Further, the RAM 308 is used as an output information development area, an environmental data storage area, and a non-volatile RAM (NVRAM).

An access of the external memory 303 is controlled by a memory controller (MC) 309. The external memory 303 is connected as an option and stores font data, an emulation program, and form data. Further, an operation unit 311 includes an operation switch and an LED indicator.

A scanner unit I/F 312 performs correction, processing, and editing on image data received from a scanner unit 313. The scanner unit 313 inputs reflective light, which is obtained by exposing and scanning an image on an original, to a charge coupled device (CCD), and converts image information into an electrical signal. Further, the scanner unit 313 converts the electrical signal into luminance signals of R, G, and B colors and reads the luminance signals as image data.

If the user instructs the scanner unit 313 to start reading, via the operation unit 311, the scanner unit 313 receives the instruction. Then, the scanner unit 313 performs reading of the original.

A method for reading the original may have a form of an automatic feeding method in which an original is set to an original feeder (not illustrated). The method may be a method in which an original is placed on a surface of a glass (not illustrated) and an exposing unit is moved to scan the original.

A storage medium (or recording medium) where program codes of software for realizing the function of the above-described exemplary embodiment are recorded is supplied to a system or a device. Then, a central processing unit (CPU or micro processing unit (MPU)) of the system or device reads program codes that are stored in the storage medium and executes the program codes. In this case, the program codes that are read from the storage medium realize the function of the above-described exemplary embodiment, and the storage medium where the program codes are recorded constitutes the present invention. The central processing unit of the system or the device executes the read program codes, and an operating system (OS) that is operated on the system or the device executes a portion or all of actual processes, based on an instruction of the program codes. The case where the function of the above-described exemplary embodiment is realized by the processes is also included in a scope of the present invention.

Further, the program codes that are read from the storage medium are written in a memory that is included in a function expansion card inserted into the system or the device or a connected function expansion unit. Thereafter, a CPU that is included in the function expansion card or the function expansion unit executes a portion or all of actual processes, based on the instruction of the program codes. The case where the function of the above-described exemplary embodiment is realized by the processes is also included in a scope of the present invention.

When the present invention is applied to the storage medium, the storage medium (computer readable storage medium) stores program codes corresponding to the above-described flowcharts.

According to the above-described exemplary embodiment, the load of the worker for the sorting of the paper discharged to the paper discharge destinations can be reduced, and the off-line finishing or the near-line finishing can be easily performed. Further, according to the above-described exemplary embodiment, since the printing process and the finishing process can be easily performed in parallel, the overall throughput can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-255503 filed Sep. 30, 2008, which is hereby incorporated by reference herein in its entirety.

What is claimed is:

1. A printing apparatus that receives a print instruction to create a print product including a plurality of constituent parts and has a plurality of paper discharge destinations the apparatus comprising:

a first determination unit configured to determine, when a plurality of copies of the print product are printed, a first number of copies of the print product to be discharged to a single paper discharge destination based on an output number of sheets of a constituent part and an upper limit number of sheets loadable by the single paper discharge destination, such that the constituent part is not divided and discharged to separate paper discharge destinations;

a second determination unit configured to determine a second number of copies of the print product to be discharged to a paper discharge destination other than the single paper discharge destination based on the output number of sheets of the constituent part and a maximum number of sheets to be fed to a finisher to be used for creating the print product;

a comparison unit configured to compare the first and second numbers of copies; and a control unit configured to control, as a result of the comparison, to print out the plurality of constituent parts according to the first number of copies in a case where the first number of copies is less than the second number of copies and to print out the plurality of constituent parts according to the second number of copies in a case where the first number of copies is more than the second number of copies, wherein the control unit controls to output the plurality of constituent parts to the respective different paper discharge destinations according to a type of each constituent part.

2. The apparatus according to claim 1, wherein the type of each constituent part is one of a bookblock and a cover.

3. The apparatus according to claim 1, further comprising:

a display control unit configured to display a setting screen for setting an automatic mode or a designation mode as a determination method for the numbers of copies, wherein the first and second determination units determine the respective first and second numbers of copies in a case where the automatic mode is set via the setting screen.

4. A method for a printing apparatus that receives a print instruction to create a print product including a plurality of constituent parts and has a plurality of paper discharge destinations, the method comprising:

determining, when a plurality of copies of the print product are printed, a first number of copies of the print product to be discharged to a single paper discharge destination based on an output number of sheets of a constituent part and an upper limit number of sheets loadable by the single paper discharge destination, such that the constituent part is not divided and discharged to separate paper discharge destinations;

determining a second number of copies of the print product to be discharged to a paper discharge destination other than the single paper discharge destination based on the output number of sheets of the constituent part and a maximum number of sheets to be fed to a finisher to be used for creating the print product;

comparing the first and second numbers of copies; and controlling, as a result of the comparison, to print out the plurality of constituent parts according to the first number of copies in a case where the first number of copies is less than the second number of copies and to print out the plurality of constituent parts according to the second number of copies in a case where the first number of copies is more than the second number of copies, wherein controlling controls to output the plurality of constituent parts to the respective different paper discharge destinations according to a type of each constituent part.

5. The method according to claim 4, wherein, the type of each constituent part is one of a bookblock and a cover.

6. The method according to claim 4, further comprising:

displaying a setting screen for setting an automatic mode or a designation mode as a determination method for the numbers of copies, wherein determining comprises determining the respective first and second numbers of copies in a case where the automatic mode is set via the setting screen.

7. A non-transitory computer-readable storage medium containing computer-executable instructions for causing a computer to execute a method for a printing apparatus that receives a print instruction to create a print product including a plurality of constituent parts and has a plurality of paper discharge destinations, the information processing method including:

determining, when a plurality of copies of the print product are printed, a first number of copies of the print product to be discharged to a single paper discharge destination based on an output number of sheets of a constituent part and an upper limit number of sheets loadable by the single paper discharge destination, such that the constituent part is not divided and discharged to separate paper discharge destinations;

determining a second number of copies of the print product to be discharged to a paper discharge destination other than the single paper discharge destination based on the output number of sheets of the constituent part and a maximum number of sheets to be fed to a finisher to be used for creating the print product;

comparing the first and second numbers of copies; and controlling, as a result of the comparison, to print out the plurality of constituent parts according to the first number of copies in a case where the first number of copies is less than the second number of copies and to print out the plurality of constituent parts according to the second number of copies in a case where the first number of copies is more than the second number of copies, wherein controlling controls to output the plurality of constituent parts to the respective different paper discharge destinations according to a type of each constituent part.

8. The non-transitory computer-readable storage medium according to claim 7, wherein the type of each constituent part is one of a bookblock and a cover.

9. The storage medium according to claim 7, wherein the information processing method further comprises:

displaying a setting screen for setting an automatic mode or a designation mode as a determination method for the numbers of copies, wherein determining comprises determining the respective first and second numbers of copies in a case where the automatic mode is set via the setting screen.

* * * * *